United States Patent [19]

Rady et al.

[11] 4,276,470

[45] Jun. 30, 1981

[54] BAR CODE READER

[75] Inventors: Bruce A. Rady, Palatine; Thomas R. Wells, Des Plaines; Kenneth Hendrickson, Chicago, all of Ill.

[73] Assignee: Bell & Howell Company, Chicago, Ill.

[21] Appl. No.: 40,778

[22] Filed: May 21, 1979

Related U.S. Application Data

[63] Continuation-in-part of Ser. No. 808,205, Jun. 20, 1977, abandoned.

[51] Int. Cl.³ .................... G06K 7/10; G06K 19/06; G08C 9/06
[52] U.S. Cl. .................................. 235/463; 235/493; 250/569
[58] Field of Search ............... 235/463, 462, 475, 474, 235/476, 494, 458, 466, 467; 250/569; 340/146.3 K, 146.3 Z; 360/73

[56] References Cited

U.S. PATENT DOCUMENTS

| | | | |
|---|---|---|---|
| 3,229,073 | 1/1966 | Macker | 235/458 |
| 3,331,947 | 7/1967 | Johnson | 360/73 |
| 3,700,858 | 10/1972 | Murthy | 235/463 |
| 3,701,886 | 10/1972 | Jones | 235/462 |
| 3,752,963 | 8/1973 | Herrin | 235/494 |
| 3,783,245 | 1/1974 | Howell | 340/146.3 K |
| 3,798,458 | 3/1974 | Buckingham | 235/463 |
| 3,891,831 | 6/1975 | Coles | 235/494 |
| 4,114,031 | 9/1978 | Bushman | 235/466 |
| 4,127,770 | 11/1978 | Baader | 235/474 |

FOREIGN PATENT DOCUMENTS

1413534 11/1975 United Kingdom .
1427811 3/1976 United Kingdom .

*Primary Examiner*—Daryl W. Cook
*Attorney, Agent, or Firm*—Alan B. Samlan; J. Warren Whitesel

[57] ABSTRACT

A single sensor system reads a traveling bar code comprising a plurality of marks separated by spaces. Each of the marks may have either of two durations and each of the spaces has a uniform duration. The bar codes are transported, relative to the sensor, at any of many different speeds so that the signals generated by the sensor may have unpredictable durations. The inventive reader determines the speed at which the bar code is being transported and interprets the signals generated by the bar code marks according to the determined speed. As used herein, the reference to "any of many different speeds" recognizes that different bar code transport devices, owing to their own inherent characteristics, may operate at different speeds although the speed for any given code transport device will tend to be fairly uniform. In some embodiments, the invention accommodates speed fluctuations in the operation of a single transport device.

31 Claims, 11 Drawing Figures

FIG. 5
FILM TRANSPORT VELOCITY VS TIME

BAR CODE READER

This is a continuation-in-part of our co-pending application Ser. No. 808,205, filed June 20, 1977, now abandoned.

This invention relates to bar code readers and, more particularly, to means for reading bar codes which may travel past a single sensor at any random one of many different speeds, which are generally unpredictable insofar as the original creator of the code is concerned. Hence the code may be described as "speed-sensitive" and it is not easy to design a reader which can accomodate randomly different speed parameters.

A bar code is a series of marks which may be encoded in various ways to convey selected information to a sensor. The term "traveling" bar code is used herein to mean that each of the code marks is presented one at a time to a sensor. It is irrelevant whether the code is on a movable web or medium traveling past a stationary sensor, or a movable sensor travels past a stationary code, or both the code and sensor move relative to each other.

Bar codes may be used for many different purposes, such as to identify a thing or a location. An example of bar codes used to identify things is found in the codes currently being placed on grocery items. An example of bar codes used for identifying locations is found on film strips wherein each frame or other photographic area is identified by an individually associated bar code. In both of these examples, the codes may be presented to a reader in any of an almost infinite number of different speeds.

There are two aspects of speed variations which should be considered. First, each bar code transport mechanism will inherently be different in some degree from every other bar code transport. Here, the bar code transport speed tends to be fairly uniform for any given transport mechanism, but grossly different from reader to reader. It would be possible to tighten manufacturing tolerances to a degree where these differences between individual machines are minimal, but these tight tolerances increase costs. Also, these differences in bar code transport speeds will tend to increase and become more pronounced with wear, maintenance (or lack of maintenance), etc.

Second, the speed of any given bar code transport means may fluctuate from time to time. This fluctuation could be caused by starting, stopping, picking up or losing speed, or the like. Here, the bar code transport speed is not uniform for a given mechanism.

A third situation which leads to tape transport speed variations, relative to the reader, might be a combination of the previously-mentioned two.

In general, the inventive bar code reader is concerned with the first of the speed variations (i.e., to enable different machines to read a given code while operating at their own speeds). The inventive reader is primarily designed to read a bar code which tends to be traveling at a fairly uniform—but not too closely controlled—speed; thus, the speed may vary widely from one transport to another. However, certain aspects of the invention enable it to accommodate the second of the speed variations and to read codes despite some fluctuations in the transport mechanism. Obviously, every machine must operate within certain design parameters. Therefore, if the fluctuations exceed the parameters of a given design, it cannot be readable.

As a generality, a separate input or formula must be provided for every variable in a mathematical problem. Then, by combining these separate inputs or formulas, the mathematical problem may be solved. However, if less than one input per variable is available, the mathematical problem cannot be solved. In a similar manner and as a generality, there must be an input signal for every variable in a bar code reading system. If there are more variables than there are input signals, the code cannot be accurately read.

For a bar code reader, the possible variables are the code-reading timing rate, the voltage (or current) produced in or by a sensor responsive to reading the code marks, and the duration of a sensor output responsive to each individual code mark. If the code is presented to the sensor at an unknown speed, there is no way of knowing the duration of the individual bar code marks. Hence, there is no reliable way of reading the bar code unless at least one more input is provided to indicate the bar code traveling speed or to clock the reading sensor. In general, the term "clocking" is used to identify these timing problems.

Heretofore, clocking problems have often been solved by providing two sensors which experience similar code-reading events. For example, when one of the sensors encounters a code mark, it enables or strobes the other sensor. If the other sensor is then reading a mark, it is interpreted as a binary "1" (or "0"). If the other sensor is not then reading a code mark, it is interpreted as a binary "0" (or "1"). In other systems, the two sensors are positioned predetermined distances from each other so that a wide signal may mask both sensors simultaneously while a narrow signal can not so mask both sensors. A variation on this same principle is to provide a bundle of optical fibers distributed in a geometrical pattern which is masked by wide but not by narrow marks. These and similar schemes require two sensors and, therefore, require added costs.

Accordingly, an object of this invention is to provide new and improved bar code readers, especially single sensor readers for bar codes which may travel at an unknown or unpredictable speeds. A further object of some embodiments is to accommodate minor fluctuations in the transport speed.

Yet another object of the invention is to provide readers, for traveling bar codes, which transfer functions heretofore performed by a bar code sensor to an electronic control circuit and particularly to electronic logic controllers or microprocessors.

In keeping with an aspect of this invention, these and other objects are accomplished by providing a single sensor head for reading a traveling bar code. The resulting output signals are fed from the sensor into an electronic logic controller or microprocessor which computes the true meaning of the bar code responsive to a detection of a constant stored within the code itself. In particular, a uniform characteristic of the code is used to provide clocking signals. When the range of travel speeds is too great, an electronic logic controller or microprocessor is supplied with other data taken from other sources, which enables a code comparison to be made responsive to other, non-encoded data. For example, tachometers may detect the bar code travel speed and feed the resulting information into the control circuit, which is then able to interpret the sensor output responsive to the bar code.

The nature of various embodiments of the invention may be understood from a study of the attached drawings wherein.

The invention is not necessarily limited to use with any particular structure or other device. However, so that a specific example may be available to illustrate such a use, reference may be made to U.S. Pat. No. 4,110,020 which was co-pending with our parent application Ser. No. 808,205, filed June 20, 1977, and assigned to the assignee of this invention. This reader/printer is controlled by an electronic logic controller or microprocessor and is arranged to transport a roll of film having microimages contained thereon, in distinctive photographic areas. The reader/printer of U.S. Pat. No. 4,110,020 has an automatic call-up feature, so that any given photographic area may be selected and projected responsive to the push of a button, the operation of a rotary switch, or the like. A special bar code is printed along an edge of the film preferably to be read by an optical-electronic sensor, in order to enable an accurate location and display of a selected photographic area according to designations associated with the operated push button or rotary switch.

Figure 1:
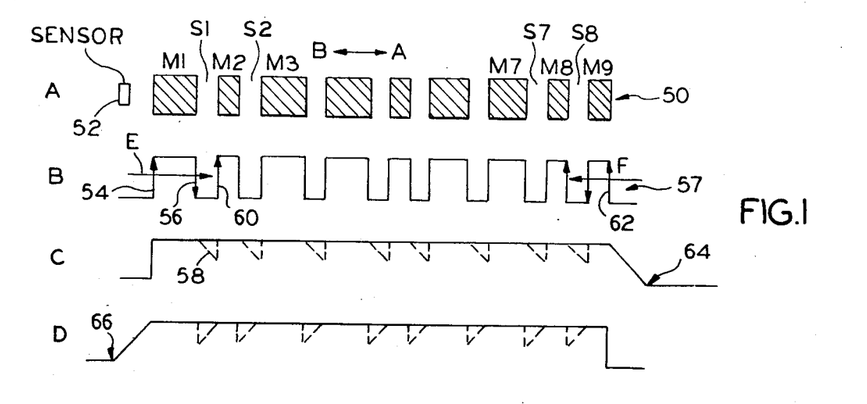
FIG. 1 graphically shows an exemplary bar code and explains how it may be read by a single sensor when the bar code traveling speed does not vary significantly.

The nature and function of the bar code used to identify each photographic area is shown at 50 in FIG. 1. There are a number (here, nine) of spots or marks M1, M2, M3 . . . M7, M8, M9 arranged in a series and in a distinct geometry along the edge of the film. Each binary "1" in the bar code is a wide spot or mark, as at M1, M3 . . . M7 and each binary "0" is a narrow spot or mark, as at M2 . . . M8, M9. Each wide spot is exactly twice as wide as a narrow spot. The widths of the spaces S1, S2 . . . S7, S8 between each spot or mark is exactly the same as the width of a narrow spot M2 . . . M8, M9. In one aspect of the invention, the uniform spaces are, in effect, used as a train of clock pulses.

A sensor or transducer 52 is positioned to read each of the bar codes as the film passes beneath it. (It is irrelevant whether the bar code 50 moves past the sensor 52 or the sensor moves past the code.) For example, if the spots or marks are dark areas recorded on tansparent film (or transparent marks recorded on dark film), the sensor 52 may include a light source on one side of the film and a photocell on the other side of the film. It is also totally irrelevant whether the bar code is read from left to right or from right to left. However, it is convenient to have an expression for distinguishing between these two directions; therefore, one direction A is arbitrarily called "forward" and the other direction B is called "reverse."

FIG. 1, B shows the output of the sensor 52, responsive to its reading of the bar code 50. As the leading edge of mark M1 (traveling in direction B) passes under sensor 52, an output voltage from the sensor rises, as shown at 54. When the trailing edge of mark M1 passes out from under sensor 52, its output voltage falls, as shown at 56. In a similar manner, each mark in the bar code 50 generates a corresponding pulse to generate a complete pulse train 57, as shown in FIG. 1, B.

If the bar code 50 travels in a reverse direction, the sensor 52 generates the voltage pulse code except that it is in a reversed order or sequence. This sequence of voltage pulses is shown in FIG. 1, B by the arrows E and F. When the bar code 50 travels in direction B, the output of the sensor 52 may be shown with a time scale advancing in direction E. However, if the bar code travels in direction A, the output of the sensor 52 is the same, but reversed since it is at that time advancing in direction F. The logic system incorporated into the above-identified co-pending application solves the reversal problem by storing the pulses generated by sensor 52 in a shift register. The output pulses from sensor 52 are stored with shifting in direction E, when the bar code moves in direction B, and with shifting in direction F, when the bar code moves in direction A. Either way, the final output of the shift register is standing in the same encoded combination responsive to the same traveling bar code.

If the bar code travels at a uniform speed, there is no problem because the wide and narrow marks are easy to distinguish and interpret and because the start and end of the bar code is well-defined. As shown in FIG. 1, C, a timer may begin to measure a time period responsive to the trailing edge (such as 56) which occurs at the end of each mark. For example, the trailing edge 56 causes a timer (not shown) to begin to time out at 58. Before the end of a measure time period, the leading edge 60 of the next following bar code mark M2 resets the timer. During each space (S1, S2 . . . S7, S8) in the bar code, the start and reset of the timers recur. However, after the trailing edge 62 of the last mark M9 in the bar code, there is no leading edge of a following mark to reset the timer. Time out occurs at 64, and the system stands ready to read the next bar code. This period beginning at 62 and ending at 64 is called a guard zone in which the following bar code is forbidden.

FIG. 1, D shows that the same results occur regardless of whether the bar code is read in a forward or a reverse direction. Again, a time out occurs at 66, after the guard zone required to distinguish between successive bar codes. The next following bar code may be formed at any time after the point 66.

Figure 2:
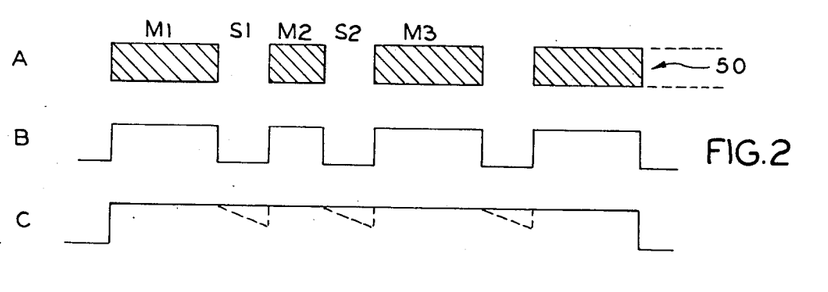
FIG. 2 graphically shows how the bar code of FIG. 1 may appear to change when the speed of bar code transport is significantly different from the speed of FIG. 1.

If the bar code travels at a different speed, it has the effect of lengthening or shortening the marks and spaces, depending upon whether the travel speed of the code slows or increases. This effective change of the marks and spaces causes the code to be speed-sensitive. As FIG. 2 shows, the same bar code 50 travels at a much slower speed so that each mark and space is under sensor 52 for a longer period of time, thereby appearing to lengthen the code. This time, the slow speed width of each space S1', S2'... has a longer duration than the fast speed guard zone ending at 64. The slow speed narrow marks (such as M2') have a longer duration than the fast speed wide marks (as shown at M1). Therefore, it is impossible to use a simple timer, per se, to read both a fast-speed code (FIG. 1, A) and a slow-speed code (FIG. 2, A).

Figure 3:
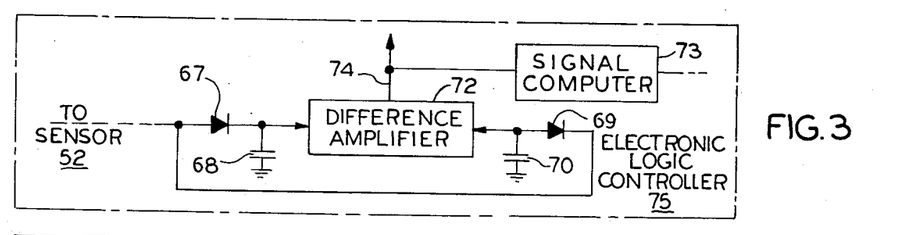
FIG. 3 is a block diagram of a simple analog sampling and storage device for reading the code of either FIGS. 1 or 2, despite the speed variance, by using the uniformity of the spaces for clocking.

According to the invention, the uniformity of spaces S1, S2...S7, S8 may be used as a clock pulse or timing standard for measuring the duration of the marks. Each of the marks must have a duration which is either equal to or twice the duration of the uniform spaces. To make this timing comparison, a pair of capacitors 68,70 are connected to opposite inputs of a difference amplifier 72. The capacitor 68 charges through diode 67 while the sensor 52 has a positive output responsive to a presence of a mark. The capacitor 70 charges through diode 69 during the immediately following period while the sensor 52 has a negative output responsive to the presence of a space. At the end of a mark and a space, an analog sample signal is formed by the charges stored on the capacitors 68,70.

At this time, the charges stored on capacitors 68,70 may be equal, which means that the mark was a narrow one. Or, the charge stored on capacitor 68 could be twice as great as the charge stored on capacitor 70, which means that the mark was a wide one. Thus, the difference amplifier 72 output voltage appearing at 74 indicates the binary values "1" or "0" depending upon whether the mark was a wide or a narrow one, regardless of whether the code travels at a fast speed as shown in FIG. 1, A or a slow speed as shown in FIG. 2, A. The voltage at 74 may be used directly or it may be fed to a signal computer 73 which is part of an electronic logic controller, microprocessor 75, or the like. The signal computer 73 reconstitutes the original bar code by producing the same output signals, regardless of whether the input is read at a fast or a slow (or some other) speed.

Figure 4:
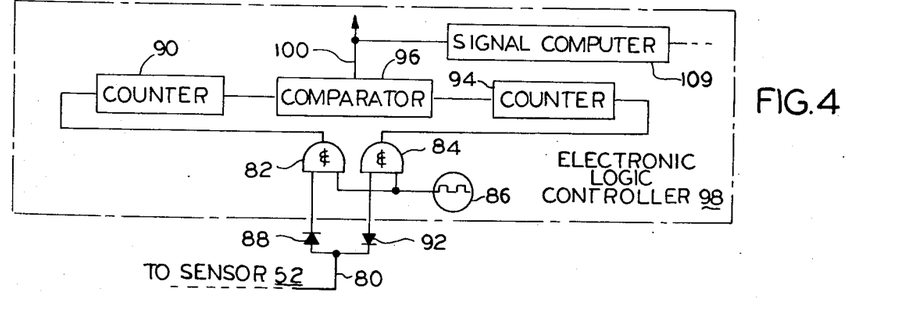
FIG. 4 is a block diagram of a slightly more complex and considerably more reliable version of the circuit of FIG. 3 wherein the samples are stored in a digital form, again by using the uniformity of the spaces for clocking purposes.

FIG. 4 shows a similar, but digital, circuit which may be used when a greater degree of accuracy is required, as compared to the accuracy provided by the analog circuit of FIG. 3. Here, the sensor 52 is coupled through an input terminal 80 to two AND gates 82,84. The second input of each of these AND gates is connected to a free-running oscillator 86.

When the output of sensor 52 goes positive to indicate a mark, diode 88 conducts to apply an enabling signal to AND gate 82. During the period while diode 88 conducts, each pulse of the free-running oscillator 86 causes AND gate 82 is conduct and pulse a counter 90. When the output of sensor 52 goes negative to indicate a space, the diode 92 conducts to enable AND gate 84. While it is so enabled, the output of free-running oscillator 86 is applied through AND gate 84 to drive a counter 94. Therefore, after a complete pulse period (a mark and the following space), the count in counter 90 represents the duration of the mark and the count in counter 94 represents the duration of the next following space.

Comparator 96 indicates the difference between the counts stored in counters 90,94, respectively. If these two counts are equal, it means that the mark was a narrow one. If the count stored at 90 is twice the count stored at 94, it means that the mark was a wide one. To make this comparison, an electronic logic controller, microprocessor, or the like 98 compares the two stored counts and gives a "0" output at output 100 if there is equality. If not, the count stored at 94 is doubled (or the count stored at 90 is divided by 2) and a second comparison is made. A "1" output is given at output 100 if there is equality. Alternatively, the controller 98 may compute a signal at 109, responsive to the comparison, in order to reconstitute and provide uniform bar code signals despite differences in the bar code transport speed.

Certain tolerances to minor count differences may be built into either the difference amplifier 72 or the comparator 96 in order to accommodate small changes in bar code transport speed, which are acceptable. Also, the last space to be read may be held in memory to compare with the last mark, which is followed by a guard zone.

The circuits of FIGS. 3 and 4 anticipate a bar code which travels at an approximately constant speed throughout the reading of an entire bar code, or, at least during a complete pulse period of a mark and the following space. Although the bar code transport speed may vary considerably from bar code to bar code, there should be a sufficient uniformity within the reading of any given bar code to enable a valid comparison to be made between the individual marks and their immediately neighboring spaces.

One solution to a problem posed by starting up or slowing down speed variations occurring during a reading of a single bar code is to allow the bar code transport mechanism to get up to speed before a code is read. At all times, the electronic logic controller may store a number of code marks as they occur so that the electronic logic controller knows how many bar codes have passed under the sensor 52 after the desired bar code is recognized. Thus, after a bar code transport has coasted to a stop, it is only necessary to back up the required number of bar code marks to reach the recognized code.

The machine in U.S. Pat. No. 4,110,020 recognizes when the bar code transport is traveling in the wrong direction. Therefore, if the bar code transport starts in the middle of the desired code, and the reader waits for the transport to get up to speed, the first read bar code will indicate that the transport is moving in the wrong direction. By the time that the transport is stopped, it will have traveled far enough so that, on the return, the transport will be able to get up to speed before it again encounters the desired bar code.

The final stopping of the bar code transport is under the control of another means which only has to recognize a correct positioning for a particular leading (or trailing) edge of a bar code mark, as distinguished from reading the code itself. Thus, there is no problem of reading a bar code which is modulated by the stopping and starting of a transport as it hunts for a home position.

Figure 5:
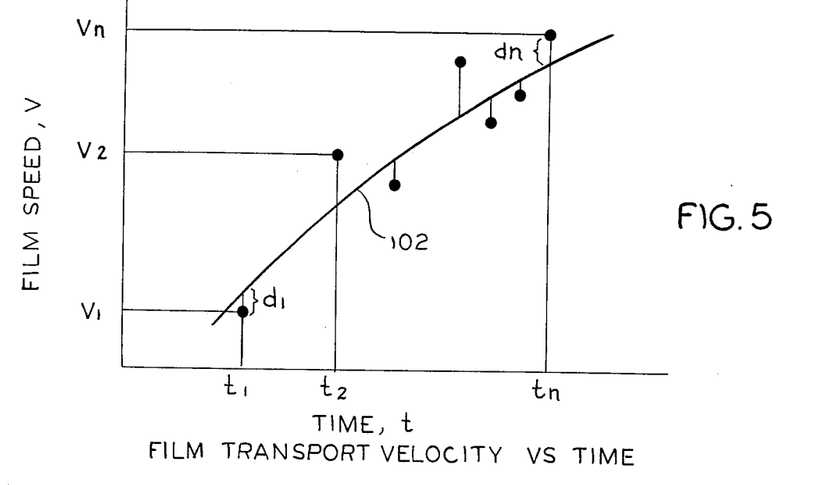
FIG. 5 is a graphical representation which is helpful for explaining curve-fitting techniques used in this invention.

Sometimes the bar code transport may be such that it cannot reach a steady speed before a bar code must be read; hence, such a bar code must be read during an interval while the bar code transport speed is actually fluctuating within the space required for a reading of a single bar code and even during a mark within a bar code. FIG. 5 has been drawn to illustrate the problems which grow out of reading bar codes while their speed is fluctuating, as distinguished from showing specific circuitry.

An embodiment of the invention may use curve fitting wherein a microprocessor calculates the apparent meaning of bar code signals which are sensed on a basis of curve fitting. Incoming data may be compared with the stored curves to determine whether there is or is not a fit between the curves and the data. Or, conversely, the microprocessor may take in the sensed data to establish grid points and then calculate the curve which fits those grid points. A number of small hand-held calculators (such as the fully-programmable Hewlett-Packard calculator) have the curve-fitting and curve-calculating capabilities required to carry out these functions. The same principles can be built into the microprocessor of U.S. Pat. No. 4,110,020.

In essence, this calculator compares the sensor signals responsive to the spaces. For example, if each of the signals responsive to a space appear to be increasing by, say, 10%, it is obvious that the signals responsive to the marks must also be increased by 10%. In like manner, empirically-derived data may be stored in a microprocessor memory to accommodate acceleration and deceleration of the reader and the sensor-read data may be fitted to that curve. For example, in the foregoing illustration, the curve for the sensor response to space signals would have a slope indicating a 10% increase. When the sensor response to mark signals is received, it is adjusted by 10% to fit the curve.

In greater detail, a curve 102 (FIG. 5) represents a hypothetical deceleration characteristic of the bar code transport mechanism. It is assumed that the bar code transport is traveling at some "normal" speed prior to time t1, when the driving power is shut off or the brakes are applied. The transport slows over a period until it comes to a complete stop. During at least part of this speed change cycle, depending upon design parameters, the reading speed may be calculated by known mathematical techniques. The average film velocity, $V_i$, over the ith code space, can be computed from:

$$V_i = l_s/t_{si}$$

where:
$l_s$ = length of a standard code space
$t_{si}$ = the time required to cross ith code space.

Typical film velocity points are shown plotted versus time in FIG. 5. A curve can be fitted to these points by the least squares method in order to predict the velocity during the interval immediately following the last velocity point. Short-term prediction is possible because the film transport has inertia which prohibits instantaneous velocity changes. The least squares method fits a curve to the V data points, such that:

$$\frac{1}{n} \sum_1^n d_i^2 \qquad (2)$$

is a minimum, where $d_1$ is the difference between an observed value $V_i$ and the value $V(t_i)$ of the least squares approximating the velocity curve, at time $t_i$.

The least squares curve can be lineaer, according to the equation:

$$V = a_o + a_i t \qquad (3)$$

or nonlinear according to the equation:

$$V = ct + dt^2 \qquad (4)$$

or one of many other and more complex curves.

For the linear equation (3):

$$a_1 = \frac{\Sigma t_i v_i - \frac{\Sigma t_i \Sigma v_i}{n}}{\Sigma t_i^2 - \frac{(\Sigma t_i)^2}{n}} \qquad (5)$$

$$a_o = \frac{\Sigma v_i}{n} - a_i \frac{\Sigma t_i}{n} \qquad (6)$$

For the nonlinear equation (4), $$d = \frac{(\Sigma t_i^2)(\Sigma t_i^2 v_i) - (\Sigma t_i v_i)(\Sigma t_i^3)}{(\Sigma t_i^4)(\Sigma t_i^2) - (\Sigma t_i^3)^2} \qquad (7)$$

$$c = \frac{\Sigma t_i v_i - d \Sigma t_i^3}{\Sigma t_i} \qquad (8)$$

($i = 1, 2, \ldots n$ in equations (5) through (8)).

The length of the code mark $l_m$, following the last velocity determination $v_n$, can be obtained from a least squares velocity equation and from the time during which the single sensor senses a code mark. If the sensor is sampled at intervals having the duration t, the estimated code mark length is $$l_m = \Delta t \sum_{k=1}^{\Sigma} v_k \qquad k = \frac{\text{duration of code mark}}{\Delta t} \qquad (9)$$

where
$\Delta t$ = sensor sample interval
$V_k$ = film velocity computed from a least squares velocity equation (such as (3) or (4)) at the kth sample time.
k = positive integer If $0.5 \, l_s \leq l_m \leq 1.5 \, l_s$, the code mark can be considered a "0". If $1.5 \, l_s < lm \leq 2.5 \, l_s$, the code mark can be considered a "1." If $l_m < 0.5 \, l_s$ or $l_m > 2.5 \, l_s$, the code mark can be considered erroneous and discarded.

Existing microprocessors such as the Texas Instruments 9900 and the Intel 8086 have addition, subtraction, multiplication and division instructions in their instruction sets and can be used to solve equations such as equations (1) through (9). Other microprocessors such as the Fairchild F-8 do not have multiplication and division instructions in their instruction sets, but they do have routines using the instructions which they do possess to perform multiplication and division. Thus, these microprocessors can also be used to solve equations such as (1) through (9).

More information relating to curve fitting may be obtained from the following references:

1. Hewlett Packard STAT PAC 1, page 49 and page 54.

2. Handbook of Probability and Statistics with Tables; R. S. Burington and D. C., May 1953; Handbook Publishers, Inc., Sandusky, Ohio.

3. Higher Mathematics for Engineers and Scientists, I. S. and E. C. Sololnikoff, pages 525-260, 1941; McGraw-Hill Book Co., Inc., New York.

However, it is also possible that the deceleration curve may vary from this norm. For example, a newly-manufactured machine may, in fact, initially have one deceleration characteristic. As the machine is broken in, bearings set, and other parts become free, the machine may decelerate quicker. Eventually, the machine becomes older, parts tend to bind and, perhaps, controls become a little less responsive so that the deceleration characteristics fall off. Of course, the principle that the reading speed may change within a single bar code reading period is essentially the same for all stages in the machine operation. Thus, the curve fitting of FIG. 5 could also represent changes in acceleration capabilities.

The electronic logic controller or microprocessor may be programmed to make these and similar corrections based upon the expected bar code transport characteristics. The microprocessor or electronic logic controller may also be programmed to correct each mark signal by an amount derived from the slope of the line used for curve fitting. The slope may be calculated by a comparison of the adjacent spaces.

The question of which one of these methods (FIGS. 3-5) for computing mark signals is most accurate depends upon the characteristics of the bar code transport mechanism. If the speed change is gradual enough so that there is little significant change during the reading of a wide mark interval, it is usually enough to merely compare space signals or to subtract the differences between adjacent space signals and adjust the mark signals accordingly. If a significant change of speed does occur during the reading of a wide mark, a correction for the slope of the characteristic speed change curve could also be introduced into the signal computation.

As long as the bar code transport obeys a pattern which may be computed by analytical geometry, the microprocessor is able to calculate an acceptable bar code reading. However, a further complexity occurs when the transport fails to obey such a pattern. For example, if the sensor must track the bar code from or to a dead stop, the differences between the detected and true signals approach infinity. Then, it may be that no signal computation, per se, can be relied upon, and another input signal becomes essential.

Figures 6, 7:
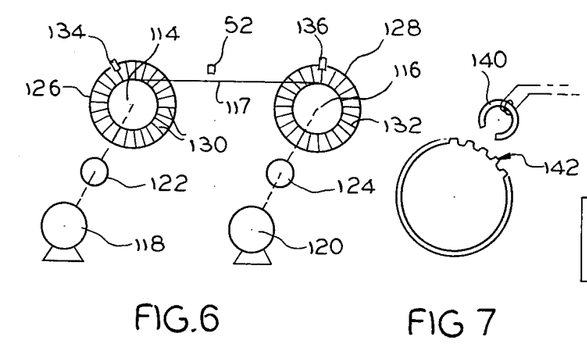
FIGS. 6-8 graphically illustrate various means using a tachometer for providing supplementary information which may be supplied to a electronic logic controller or microprocessor which computes new time-related signals to compensate for speed-related data which is missing when a single sensor is used to read a traveling bar code.
Figure 8:
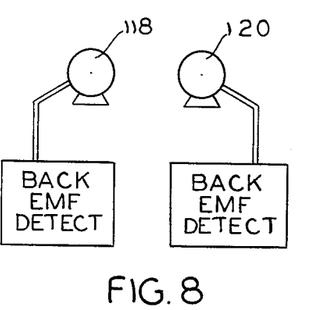

To illustrate how additional bar code transport input data may be collected, reference may be made to FIGS. 6-8.

FIG. 6 shows a bar code transport mechanism which includes a web in the form of supply reel 114 of film, a take-up reel 116, and a length of film 117 extending therebetween. Each reel is here shown as being separately driven by its individually associated motor 118,120. Perhaps each motor may also act through an individually associated gear train or other transmission devices 122,124.

Any suitable tachometer may be provided to read and indicate the speed at which each of the reels 114,116 are turning. For example, turning with one or both reels, there may be a transparent disc 126,128 having a plurality of radial non-transparent marks 130,132 formed thereon. These marks intercept light read by photocells 134,136. The relative rotary reel speeds depend upon the difference between the effective diameters of the web wound upon the individual reels. For example, if the film wound on reel 116 is nearly exhausted, the film roll has a relatively small diameter so that the disc 128 turns relatively fast. Then, the radial marks 132 intercept the light falling on photocell 136 at a high rate of speed. If the reel 116 is nearly full of film, the roll of film has a relatively large diameter and the transparent disc 128 turns more slowly than the disc 126 turns. The radial marks 132 intercept the light falling on photocell 136 at a low rate of speed. The two speeds thus indicated by the output of photocells 134,136 may be fed into the electronic logic controller or microprocessor which is then able to calculate the speed at which bar codes imprinted upon the film 117 move past the sensor 52. From this information relating to the bar code transport speed, it is easy for the electronic logic controller or microprocessor to compute the true meaning of a bar code, despite an erratic nature of a read-out code.

When the diameters of the rolls of film 114,116 are large relative to the total amount of film on the reels, it is only necessary to have one of the tachometers 126 or 128.

Another way of deriving essentially the same information is to place a magnetic pickup (such as 140, FIG. 7) adjacent teeth 142 on gears, in gear boxes 122,124, which turn with the film reel. Each time that a tooth passes a gap in the magnetic head 140, an output pulse is generated. Hence, the electronic logic controller or microprocessor receives a steady stream of pulses from pickup 140 which represent the speeds at which the two film reels 114,116 are turning.

FIG. 8 illustrates yet another method of determining the speeds at which the motors are turning and, therefore, the speed at which the film is traveling. Here, the back emf of one or both motors 118,120 is measured. The back emf varies as a function of motor speed and, therefore, of the film travel speed. Still other forms of tachometers may be provided to establish the speed at which the bar code travels past the sensor 52.

One of the characteristics of the web used in the inventive system (U.S. Pat. No. 4,110,020) is that it is wound and rewound over a long period of time so that the flexing of the web material should be held to a minimum to prevent its fatigue. This flexing minimization is accomplished by winding only a few layers of the web material on relatively large diameter hubs. For example, the web might be a roll of microfilm wound into a coiled layer which is no more than a quarter inch or so thick, on a hub which is two or three inches in diameter. Therefore, throughout most, if not all, of the transportation of the web, the two reels are turning at approximately the same speed.

If the web becomes long enough to substantially change the hub diameter, there may be a substantial difference between the two reel speeds. Therefore, a more complex speed detection system may then be required.

Figures 10, 11:
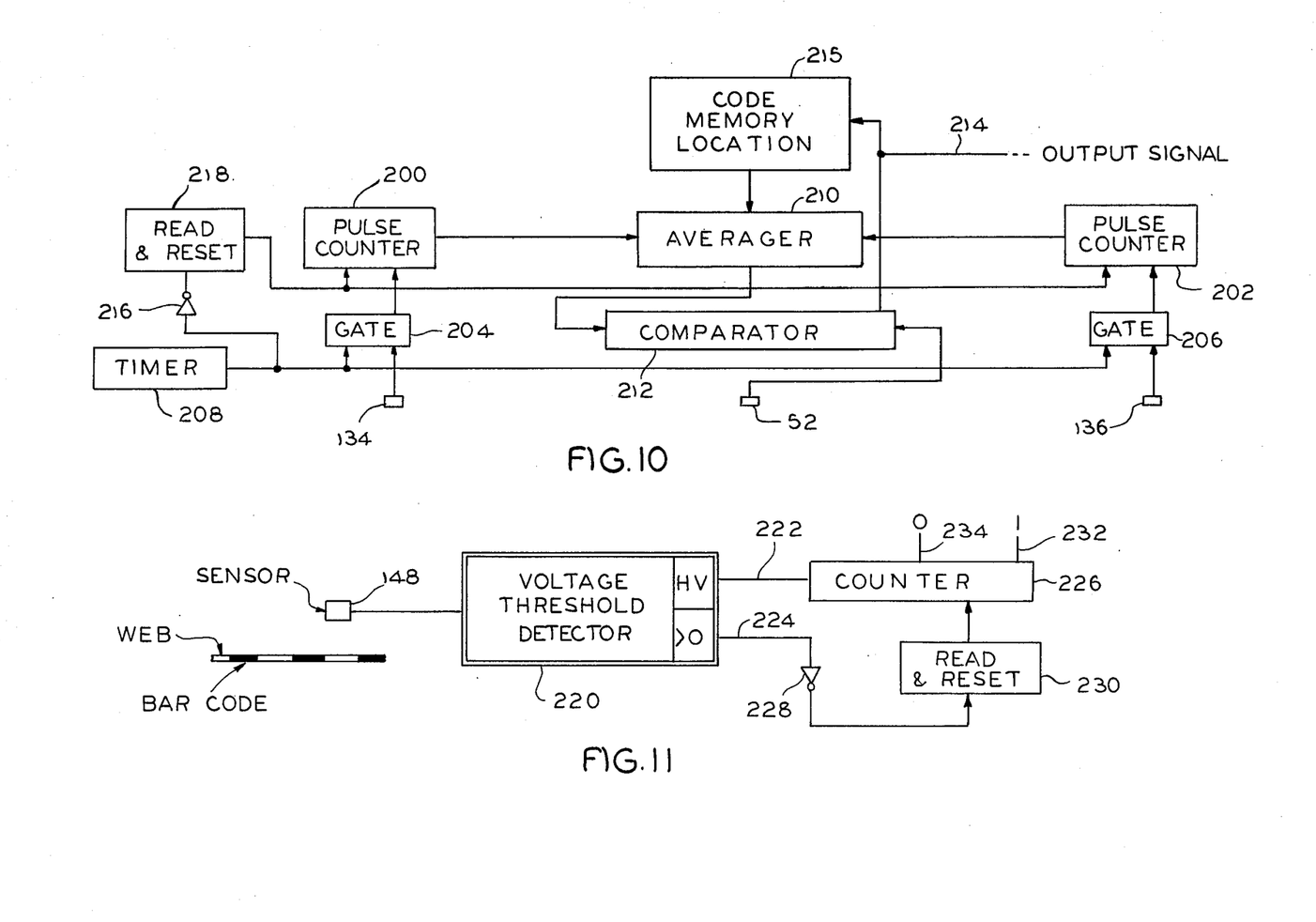
FIG. 10 shows a circuit which may be used with the tachometers of FIGS. 6-8.
FIG. 11 shows a circuit which may be used with the clock pulse strip of FIG. 9.

In FIG. 10, the two tachometer sensors 134,136 are connected to individually associated counters 200,202, which count the pulses produced each time that a beam of light is chopped by marks or dots on a rotating disc. The circuit of FIG. 10 may include any suitable means 204,206 for periodically gating the tachometer pulses into counters 200,202, under the control of a timer 208. Thus, the count stored during each gating period represents the rotary speed of the reel (114,116, FIG. 6) associated with each tachometer disc. When the timer times out, an inverter 216 pulses a read and reset circuit 218 to reset the counters and start a new counting period.

If there is not too great a disparity between the diameters of the two web rolls, the averager 210 simply adds the two counts from counters 200,202 and divides by two. After suitable division of the resulting answer to reflect the number of light-chopping marks or light-transmitting slots on discs 126,128 and a calculation based upon the circumference of the web roll, it is easy to arrive at the linear speed of the web as the bar code moves by the sensor. This web speed is fed into a comparator 212 when it is compared with the mark signals and used to read the signals received from the bar code sensor 52. The resulting output signal on line 214 represents a reconstitution of the intelligence in the bar code.

In some systems, the web may be long enough to create a substantial difference in reel speeds, as one web reel reaches maximum diameter and the other reaches minimum diameter, near the exhaustion of the web supply. However, this creates no problem. First, the variations of the circumference are linear since they vary directly with changes in the radius. Second, it is easy to know the total radius of the web wound upon a reel by knowing the total length of that web, and the location of the bar code being read along the length of the web. Accordingly, the bar codes may be stored in a memory 215 from which they may be read out in terms of the circumference of the reel.

For example, if a given bar code is, say, one foot from the start of the web, that one foot may create a coil of film one-eighth inch thick upon the reel. If the radius of the hub is exactly one inch, the radius of the film wound upon the hub is exactly 1.125 inches when the given bar code is read. Since a circumference is $2\pi r$, the circumference of the film is exactly 7.0685833 inches when the given code is read. If it takes exactly one-tenth of a second for the reel to make exactly one revolution, obviously the web and, therefore, bar code travel speed is 70.68 inches per second. It is a simple matter to program the memory 215 to read out "70.68" when the given code is detected by sensor 52.

In the usual case where each bar code represents a uniform increment of length on the web, the memory 215 only has to count the number of bar codes which have passed under the code sensor 52. Thus, in the above example, the memory 215 could be programmed to read out "70.68" responsive to the fourth bar code read after the start of reeling. That memory 215 output may then be used by the averager 210 to weight the readings received from the two counters 200,202.

When the tachometers of FIGS. 7 or 8 are used, the circuit of FIG. 10 operates in the same manner except that the signals being counted at 200,202 originate from the magnetic pickups 140 or from the back emf detectors.

Figure 9:
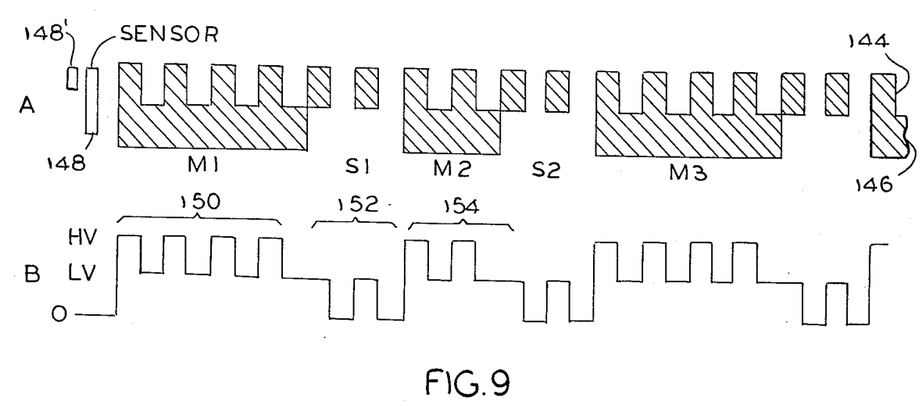
FIG. 9 illustrates how the bar code may be modified to contain clocking data which enables a single sensor to derive all of the information required to read a traveling bar code regardless of the reading speed.

Yet another embodiment of a bar code reading system is shown in FIG. 9. Here, a steady stream of uniformly spaced clock pulses 144 are printed along the length of the film. The mark and space periods of the clock pulses are uniform so that the electronic logic processor or microprocessor receives a continuous series of pulses, the repetition rate of which informs the electronic logic processor or microprocessor of the bar code transport speed. Beneath the row of clock pulses 144 is a bar code 146 comprising wide and narrow marks separated by uniform spaces. Sensor 148 is positioned to read both the clock pulses and the bar code simultaneously. Alternatively, a second reading means 148' could be provided to read the clock pulses 144 while the sensor 148 reads only the bar code.

Responsive to a reading of the codes 144,146, the output (FIG. 9B) of the sensor 148 includes three levels which are: substantially zero, in the absence of any pulse; a low signal level (LV) in the presence of either (but not both) a clock pulse or a bar code mark; and a high signal level (HV) in the presence of both clock and bar code.

The length of each bar code mark is determinative of the number of high-level signals occurring in sequence. In this example, the long mark M1 coincides with four clock pulses to produce four high-level signals, as shown at 150. During the space S1, there are two clock pulses and two clock spaces, but no bar code mark, to produce two zero signal levels and two low-level signals, as shown at 152. During a short pulse M2, there are two clock pulses to produce two high-level signal pulses, as shown at 154. Thus, it is a simple matter for the electronic logic controller or microprocessor to recognize the wide and narrow marks by counting the high signal level (HV) pulses.

When the bar code reading system uses the clock pulse track of FIG. 9, the circuit of FIG. 11 may be used to find the intelligence in the code. The output of sensor 148 (FIG. 9) is fed into a threshold voltage detector 220. The sensor output voltages which reach high voltage level HV (FIG. 9B) appear at terminal 222 (FIG. 11). A voltage appears at the output terminal 224 whenever there is any output from sensor 148 which is greater than 0-volts. Each high voltage pulse appearing at terminal 222 is counted in a counter 226.

When the sensor 148 voltage reaches 0-volts during spaces (e.g., during 152, FIG. 9), the voltage disappears from the terminal 224. An inverter 228 pulses a read and reset circuit 230. If the counter 226 had counted the four pulses 150 (FIG. 9) before it is read and reset, an output signal appears on a "1" terminal 232. If it had counted the two pulses at 154 (FIG. 9), an output appears at the "0" terminal 234 of the counter 226. The reset of counter 226 conditions it to read the next code mark.

The foregoing description has covered many principles, as if they were completely separate embodiments; however, it should be understood that this separateness is merely for convenience of description. It is contemplated that many of the described features may be combined. For example, it is possible for different types of tachometers to be combined, or for the electronic logic controller or microprocessor to use data from such tachometers to calculate compensating changes which should be made in other forms of bar code reading devices. The comparison circuits of FIGS. 3 and 4 may also use the extra row of clock pulses of FIG. 9. The clock pulses of FIG. 9 may be substituted for the clock pulses formed by the uniform spaces in the acceleration and deceleration curve fitting of FIG. 5. Therefore, the disclosure is to be construed as relating to a combination of features and not just to the enumerated features, per se.

Those who are skilled in the art will readily perceive how to modify the system. Therefore, the appended claims are to be construed to cover all equivalent structures falling within the true scope and spirit of the invention.

We claim:

1. A system for reading bar codes on a travelling web by means of a single sensor, each of said bar codes comprising a series of wide and narrow marks separated by spaces, each of said narrow marks and each of said spaces having the same predetermined width, each of said wide marks being twice as wide as each of said narrow marks, whereby the width of a combination of a mark and an adjacent space may be equal to either two or three times said predetermined width, said system comprising:
- a. a single stationary sensor means positioned adjacent said travelling web to read and give non-overlapping output signals responsive to each of said marks and spaces as they appear before said sensor responsive to the travelling of said web;
- b. means for two-state comparing of the non-overlapping output signals of said sensor responsive to each mark with the non-overlapping output signals of said sensor responsive to at least one space immediately adjacent the sensed mark;
- c. means responsive to said comparing of the mark and adjacent space for indicating whether the width of said non-overlapping sensed mark is equal to or wider than said non-overlapping sensed space; and
- d. means for signalling the intelligence of the bar code having the sensed marks and spaces responsive to said indicating means.

2. The system of claim 1 and means for separately storing the output of said sensor responsive to each mark and the output of said sensor responsive to each space.

3. The system of claim 2 wherein said storing means comprises a pair of capacitors and said comparing means comprises a difference amplifier.

4. The system of claim 2 wherein said storing means comprises a pair of counter means and said comparing means comprises a comparator for comparing the counts stored in said counter means.

5. A system for reading bar codes on a traveling web by means of a single sensor, each of said bar codes comprising a series of wide and narrow marks separated by spaces, each narrow mark and each space having a predetermined width, each wide mark being twice as wide as each narrow mark, whereby the width of a combination of a mark and a space may be equal to either two or three times said predetermined width, said system comprising:
- a. a single stationary sensor means positioned adjacent said travelling web to read said bar code and to give an output responsive to each of said marks and spaces and they appear before said sensor;
- b. means for detecting the transport speed at which said web is travelling when it presents any of said bar codes before said sensor;
- c. means jointly responsive to said speed-sensing means and to the individual space responsive outputs of said sensor means, for reading signals which appear responsive to said marks, to indicate whether said sensed marks are wide or narrow; and
- d. means responsive to said last-named means for signalling the intelligence of the bar code containing the read marks which are read by said single sensor means.

6. The system of claim 5 wherein said speed-sensing means is a tachometer for determining the speed at which said web is travelling.

7. The system of claim 6 wherein said web is transported from a supply reel to a take-up reel as said web travels and said tachometer includes a pair of light-chopping discs turning with said supply and take-up reels, respectively.

8. The system of claim 7 wherein said web is transported from a supply reel to a take-up reel as said web travels and said tachometer includes a pair of tone wheels with magnetic pickup associated with said supply and take-up reels, respectively.

9. The system of claim 6 wherein said web is transported from a supply reel to a take-up reel as said web travels, a pair of motors individually associated with said reels, and said tachometer includes means for measuring the back emf of each of said pair of motors for driving said supply and take-up reels, respectively.

10. The system of 6 wherein said speed-sensing means is a series of uniformly spaced clock pulses extending along the length of said web, adjacent said bar code, and within the area scanned by said single sensor means.

11. A process for reading a bar code on a travelling web by means of a single stationary sensor positioned adjacent said web, said bar code comprising a series of wide and narrow marks separated by spaces, each narrow mark and each space having a predetermined width, each wide mark being twice as wide as each narrow mark, whereby the width of a combination of a mark and a space may be equal to either two or three times said predetermined width, said process comprising the steps of:
- a. non-overlappingly reading the two-state condition presented by each mark and a space as said travelling bar code passes said single sensor which gives output signals responsive to said reading;
- b. comparing the non-overlapping two-state output signals generated responsive to the marks and spaces as they are read to determine whether the marks are wide or narrow marks; and
- c. reconstituting the intelligence in said bar code responsive to the comparison of step b.

12. A single sensor, bi-directional, bar code reading system comprising means responsive to said single sensor for giving signals of one characteristic responsive to marks in the signals of a traveling bar code containing alternate marks and spaces, means also responsive to said single sensor for giving signals of another characteristic responsive to spaces in said bar code, a first of said characteristics having a uniform relationship regardless of the direction in which the bar code is read and the second of said characteristics having non-uniform relationships, means responsive to reading the code in either direction for deriving information from said first and uniform characteristic relating to said bar code travel, and means jointly responsive to the sensed bar code and the derived information for indicating the information in the second and non-uniform characteristic of said bar code.

13. The system of claim 12 and means for storing by pairs successive signals generated by said single sensor, one of said stored pair of signals having said non-uniformly recurring characteristic and the other of said stored pair of signals having said uniformly recurring characteristic, means for comparing the pair of stored signals to determine whether they have a relationship which indicates a mark having one or the other of two possible meanings, and means for performing an operation upon at least one of the stored pair of signals to produce an output bar code having an original bar code symbology irrespective of the manner at which the bar code actually travels past said single sensor.

14. The system of claim 13 wherein said storage means comprises means for storing a pair of analog signals and said comparing means comprises means for indicating whether the stored pair of signals are the same or different.

15. The system of claim 13 wherein said storage means comprises means for storing two series of digital signals representing the duration of each in a pair of successive signals read from the bar code by said signal-sensing means, and said comparing means comprising means for indicating the difference between said stored pair of digital signals.

16. The system of claim 13 wherein said information-deriving means comprises means for comparing the durations of successive ones of the signals having said first characteristic generated responsive to uniform spaces in said bar code with the signals having said second characteristics generated responsive to said non-uniform marks in said bar code, and means responsive to said comparing means for indicating the meaning of each successive ones of said non-uniform marks.

17. The system of claim 16 and means responsive to said indicated meaning for computing corrected mark signals responsive to signals generated by said sensor means as it reads marks in said bar code.

18. The system of claim 17 wherein said computed signal comprises an alteration of the indicated meaning of the mark signal responsive to the differences between signals generated responsive to a space and to the next following the space.

19. The system of claim 17 wherein said signal computing means comprises means responsive to the indicated differences in successive ones of said space signals for computing a characteristic curve representing a rate of change in the bar code transport speed, and means for computing mark signals responsive to the computed characteristic curve.

20. The system of claim 13 and transport means for moving a web carrying said bar codes, whereby the traveling characteristics of the bar code varies as a function of the transport characteristics of the web, said means for deriving information relating to the manner in which the bar code travels comprises means for detecting the speed at which said web travels, and means responsive to said detected web speed for indicating the information contained in said bar code.

21. The system of claim 20 wherein said web transport means is driven responsive to at least one motor, said web speed detector means comprising a tachometer means for indicating the motor speed.

22. The system of claim 20 wherein said web speed detector means comprises a transparent disc having a plurality of radial light intercepting areas formed thereon, means for rotating said disc simultaneously with a movement of said web whereby said web speed is indicated by a detection of the rate at which said areas intercept said light.

23. The system of claim 20 wherein there is at least one gear mounted to rotate in association with said web-moving means, and said web speed detector means comprises magnetic pickup means positioned near teeth on said gear for generating a pulse each time that a gear tooth passes said pickup.

24. The system of claim 20 wherein said web is moved responsive to at least one variable speed motor whereby web speed varies as a function of the speed of said motor, and said web speed detector means comprise means operated responsive to a back emf of said motor.

25. The system of claim 20 wherein said web is wound on and transported between two reels whereby there is a changing diameter of the web rolled on each of said reels, and said web speed detecting means comprises means for detecting and comparing the speeds at which said reels rotate.

26. The system of claim 13 and a train of clock pulses positioned adjacent said bar code, and signal-interpreting means for comparing said bar code and clock pulse signals.

27. A system including a single sensor means for reading a bar code comprising a plurality of marks separated by recurring spaces, each of said marks having either of two durations which are interrelated in a 1:2 ratio and each of said spaces having a uniform duration which is equal to one of the two durations, said system further comprising means for transporting said bar code relative to said sensor means at any one of many different speeds whereby signals are generated by said sensor means responsive to the marks and spaces, with unpredictable durations, means responsive to the uniform duration of said recurring spaces for determining the timing at which said bar code is being transported, and means responsive to said determined timing for detecting which one of said two durations of marks is causing the signal then being generated responsive to the bar code mark.

28. A process for reading bar codes while being transported in either of two directions, said bar code containing signals which have both uniformly and non-uniformly recurring characteristics, said non-uniformly recurring characteristic read from said bar code signals having unpredictable durations, said process comprising the steps of:
 a. detecting and generating signals responsive to both characteristics of said bar codes as they are transported in either direction;
 b. sorting out and comparing successive signals generated responsive to said uniformly recurring characteristics in order to detect departures from uniformity; and
 c. reconstructing standard bar code signals from said non-uniformly recurring characteristics by compensating said non-uniform characteristics responsive to detected departures from uniformity during said comparison of said uniform characteristics which was made in step b.

29. The process of claim 28 wherein step b. comprises a step of comparing analog samples.

30. The process of claim 29 wherein step b. comprises a further step of storing digital signals representing said uniform characteristics and step c. comprises a further step of storing digital signals representing said non-uniform characteristics.

31. The process of claim 29 and the further step of generating a signal representing the rate at which said bar codes are transported, and step c. comprises the further step responsive to said signal representing said rate of speed for reconstituting signals having non-uniformly recurring characteristics by modifying signals generated responsive to said bar code.

* * * * *